United States Patent
Umhoefer et al.

(10) Patent No.: US 10,403,408 B2
(45) Date of Patent: Sep. 3, 2019

(54) PASSIVE VISUAL FUEL TEMPERATURE INDICATOR

(71) Applicants: Elizabeth Umhoefer, Wilmington, NC (US); Scott Pfeffer, Wilmington, NC (US); Maria Pfeffer, Wilmington, NC (US)

(72) Inventors: Elizabeth Umhoefer, Wilmington, NC (US); Scott Pfeffer, Wilmington, NC (US); Maria Pfeffer, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 877 days.

(21) Appl. No.: 13/727,048

(22) Filed: Dec. 26, 2012

(65) Prior Publication Data
US 2014/0177774 A1      Jun. 26, 2014

(51) Int. Cl.
*G21C 17/112* (2006.01)
*G21C 3/326* (2006.01)

(52) U.S. Cl.
CPC ............ *G21C 17/112* (2013.01); *G21C 3/326* (2013.01); *Y02E 30/38* (2013.01)

(58) Field of Classification Search
CPC .......... G01K 11/06; G21G 9/02; B29C 17/02; G21C 17/112; G21C 3/326
USPC .................................. 116/114.5, 217; 29/511
See application file for complete search history.

(56) References Cited

U.S. PATENT DOCUMENTS

| | | | | |
|---|---|---|---|---|
| 3,518,961 A | * | 7/1970 | Kovac | G01K 11/06 116/217 |
| 3,618,558 A | * | 11/1971 | Tepfer | G01K 11/08 116/216 |
| 3,785,336 A | | 1/1974 | Roszkowski | |
| 3,965,849 A | * | 6/1976 | Gee | B29C 57/00 116/218 |
| 4,143,617 A | * | 3/1979 | Youngren | G01K 11/06 116/218 |
| 5,490,475 A | | 2/1996 | Bryant et al. | |

(Continued)

FOREIGN PATENT DOCUMENTS

FR          2345709 A2     10/1977

OTHER PUBLICATIONS

Carl Nehls Alloy Co. "Metallurgical & Chemical Engineering, vol. XV, No. 12" (1916). p. 86 of advertisement section. digitized by Google Jun. 12, 2009. full journal available online: <http://books.google.com/books?id=TAdEAAAAYAAJ>.*

(Continued)

*Primary Examiner* — Lily C Garner
(74) *Attorney, Agent, or Firm* — Harness, Dickey & Pierce, P.L.C.

(57) ABSTRACT

A fuel bundle temperature sensing device may include an indicating rod made of a first material; an outer housing having an upper opening, the outer housing being made of a second material and surrounding at least a portion of the indicating rod; and a rod holder attached to an inner surface of the outer housing, the rod holder being made of a third material and being configured to support the indicating rod such that a top surface of the rod extends out of the upper opening of the outer housing, the third material having a lower melting point than the first and second materials.

19 Claims, 4 Drawing Sheets

(56) References Cited

U.S. PATENT DOCUMENTS 6,176,197 B1     1/2001   Thompson
6,302,054 B1 * 10/2001   Mayer, III ............... G01K 1/02
                                                                                           116/216

OTHER PUBLICATIONS

Nehls supplement, "Machinery." 1915. v. 21, Industrial Press. p. 424. available online: <http://books.google.com/books?id=z7hNAQAAIAAJ&pg=GBS.PA424>.*
PCT Search Report and Written Opinion dated Apr. 3, 2014 in connection with corresponding PCT Patent Application No. PCT/US2013/072998.

* cited by examiner

PASSIVE VISUAL FUEL TEMPERATURE INDICATOR

BACKGROUND

1. Field

This disclosure relates generally to monitoring temperatures in nuclear reactors.

2. Description of Related Art

Irradiated fuel generates heat due to radioactive decay, even after it is removed from a nuclear reactor. If the material is intended for reload into a reactor or will reside in long-term dry storage, safe storage is of paramount concern for the operating utility. One tenet of safe storage is appropriate cooling of the fuel assembly to preserve fuel and cladding integrity. Temperature excursions within guide tubes can potentially damage assemblies, making them unfit for reuse in a reactor or dry cask storage. Accordingly, it is desirable to obtain information indicating a temperature of the fuel assembly.

SUMMARY

One or more embodiments relate to a temperature sensing device for indicating a temperature of a fuel bundle; and a reactor system including the temperature indicating device.

According to at least one example embodiment a temperature indicator may include an indicating rod made of a first material; an outer housing having an upper opening, the outer housing being made of a second material and surrounding at least a portion of the indicating rod; and a rod holder attached to an inner surface of the outer housing, the rod holder being made of a third material and being configured to support the indicating rod such that a top surface of the rod extends out of the upper opening of the outer housing, the third material having a lower melting point than the first and second materials.

The outer housing may have a bottom surface that is below the upper opening and below a first position on the inner surface of the outer housing at which the rod holder is attached to the outer housing.

A first distance between the uppermost surface of the indicating rod and the upper opening of the outer housing may be less than a second distance between a bottom surface of the rod and the bottom surface of the outer housing.

A region within the outer housing in between the first position and the bottom surface of the outer housing may be filled with air.

The third material may be aluminum.

The outer housing may be cylindrical in shape and the rod holder may be a circular disk attached to the inner surface of the outer housing.

The circular disk may be attached to the outer housing such that the circular disk spans an inner diameter of the outer housing.

The indicating rod, the outer housing and the rod holder may each be configured such that if the rod holder melts, the indicating rod will fall within the outer housing such that the top surface of the rod is not visible above the upper opening of the outer housing.

According to at least one example embodiment, a nuclear reactor system may include a fuel bundle; and a temperature indicator inside the fuel bundle, the temperature indicator including an indicating rod made of a first material, an outer housing having an upper opening, the outer housing being made of a second material and surrounding at least a portion of the indicating rod, and a rod holder attached to an inner surface of the outer housing, the rod holder being made of a third material and being configured to support the indicating rod such that a top surface of the rod extends out of the upper opening of the outer housing, the third material having a lower melting point than the first and second materials.

The outer housing may have a bottom surface that is below the upper opening and below a first position on the inner surface of the outer housing at which the rod holder is attached to the outer housing.

A first distance between the uppermost surface of the indicating rod and the upper opening of the outer housing may be less than a second distance between a bottom surface of the rod and the bottom surface of the outer housing.

A region within the outer housing in between the first position and the bottom surface of the outer housing may be filled with air.

The third material may be aluminum.

The outer housing may be cylindrical in shape and the rod holder may be a circular disk attached to the inner surface of the outer housing.

The circular disk may be attached to the outer housing such that the circular disk spans an inner diameter of the outer housing.

The indicating rod, the outer housing and the rod holder may each be configured such that if the rod holder melts, the indicating rod will fall within the outer housing such that the top surface of the rod is not visible above the upper opening of the outer housing.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
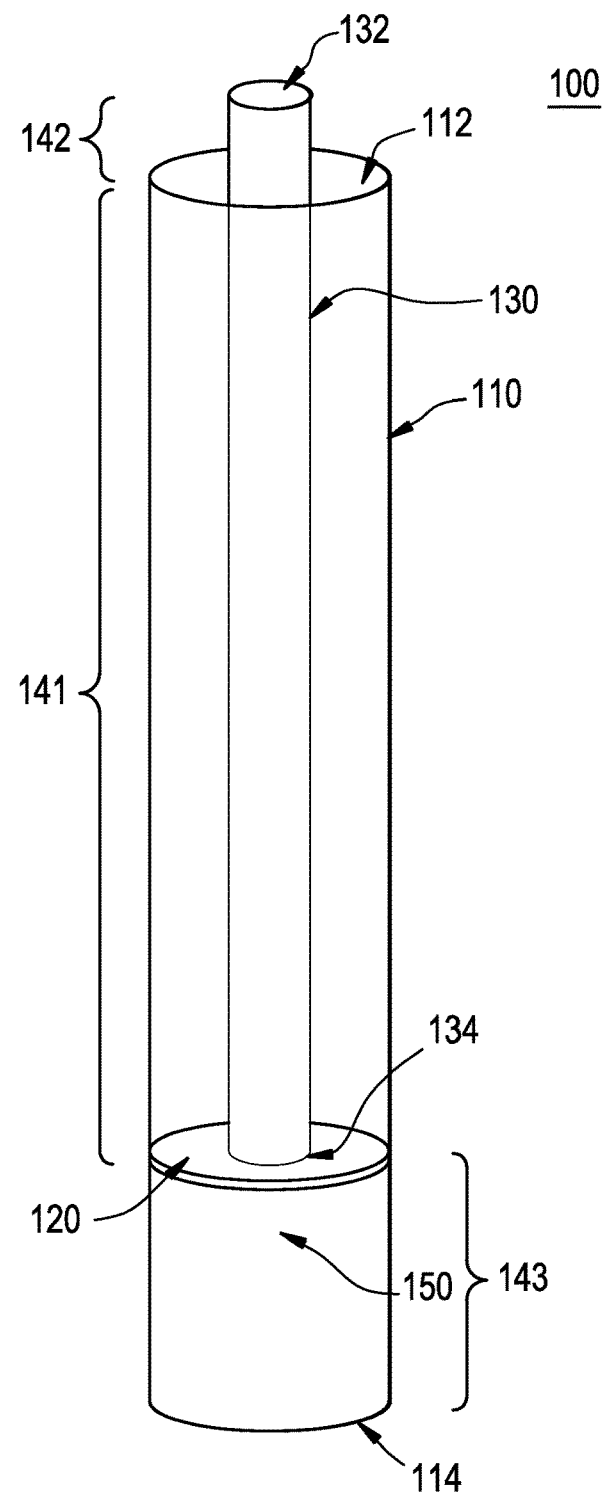
FIG. 1 illustrates a fuel bundle temperature sensing device during normal temperature conditions according to at least one example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

For used fuel storage it is desirable to keep the fuel and cladding temperatures below certain limits. A fuel bundle temperature sensing device according to at least one example embodiment is a simple passive device which may operate without relying upon any active systems and provide an indication of assembly integrity under many conditions. As will be discussed in greater detail below, the fuel bundle temperature sensing device according to at least one example embodiment is a mechanical, temperature-sensitive device that can be placed at key locations of a fuel bundle to help understand the structural integrity of the fuel and gauge the temperature of the bundle in key locations. The fuel bundle temperature sensing device according to at least one example embodiment will be discussed in greater detail below with reference to FIGS. 1 and 2.

Figure 2:
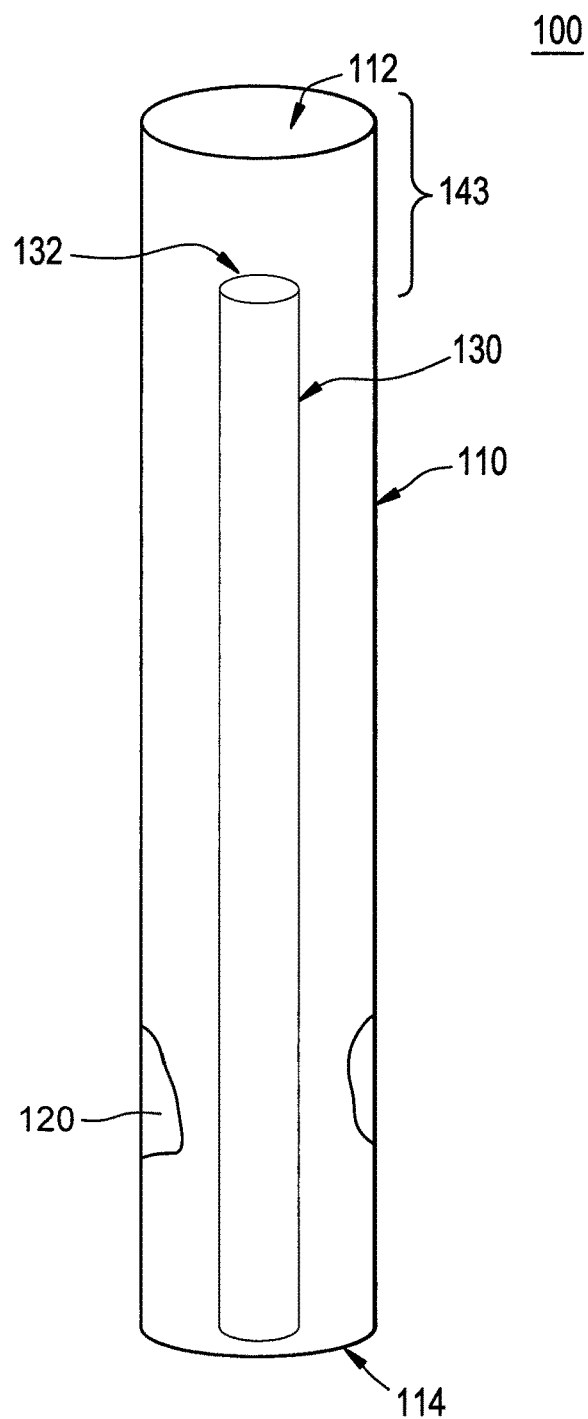
FIG. 2 illustrates a fuel bundle temperature sensing device during excessive temperature conditions according to at least one example embodiment.

FIGS. 1 and 2 illustrate a fuel bundle temperature sensing device 100 according to at least one example embodiment. The temperature sensing device 100 includes an outer housing 110, a rod holder 120, and an indicating rod 130. As will be discussed in greater detail below, a position of the indicating rod 130 within the outer housing 110, which may be an elevated position or a fallen position, indicates a temperature inside the fuel bundle temperature sensing device 100. FIG. 1 illustrates the fuel bundle temperature sensing device 100 during normal temperature conditions. FIG. 2 illustrates the fuel bundle temperature sensing device 100 during excessive temperature conditions.

Referring to FIG. 1, the outer housing 110 may be, for example, a cylindrical tube having an open end 112 at the top and a closed end 114 at the bottom. The outer housing may have a width sufficient to fit in between fuel rods of a fuel bundle inside a nuclear reactor. The outer housing 110 may be composed of a material having a high melting point. Examples of the material of the outer housing 110 include metals with high melting points, for example, 304 or 316 stainless steel. Though stainless steel is provided as an example, the material of the outer housing 110 may be chosen in accordance with the preference of an operator of the reactor facility in which the temperature sensing device 100 is used and may be any rigid material, for example a metal, having a melting point high enough to withstand temperatures within a fuel bundle.

The rod holder 120 is attached to an inner surface of the outer housing 110 at a position below the upper opening 112 and above the lower surface 114 of the outer housing 110. With respect to the embodiment in which the outer housing 110 is a cylindrical tube, the rod holder 120 may be, for example, a disc having a diameter which spans the inner surface of the cylindrical tube as is illustrated in FIG. 1. The rod holder 120 may be composed of a material having a melting point lower than the melting point of the material of the outer housing 110. For example, the rod holder 120 may be composed of aluminum.

The indicating rod 130 may be, for example, a long slender rod. For example, the indicating rod 130 may have a width smaller than a width of the upper opening 112 of the outer housing 110, and a length shorter than a distance between the upper opening 112 and the lower surface 114 of the outer housing 110. Like the outer housing 110, the material of the indicating rod 130 may be chosen in accordance with the preference of an operator of the reactor facility in which the temperature sensing device 100 is used and may be any rigid material, for example a metal, having a melting point high enough to withstand temperatures within a fuel bundle. Examples of the material of the outer housing include metals with high melting points, for example, 304 or 316 stainless steel. According to at least one example embodiment, the material of the indicating rod 130 may be the same as the material of the outer housing 110.

As is illustrated by the example shown in FIG. 1, under normal temperature conditions, the indicating rod 130 is in an elevated position where an upper surface 132 of the indicating rod is above the upper opening 112 of the outer housing 110, and a bottom surface 134 of the indicating rod 130 rests upon the rod holder 120.

Normal temperature conditions may be defined as conditions in which a temperature inside the fuel bundle temperature sensing device 100, for example at the location of the rod holder 120, is below a reference temperature threshold. The reference temperature threshold may be set in accordance with the preferences of an operator of the reactor facility in which the temperature indicating device 100 is being used. According to at least one example embodiment, the reference temperature is equal to a melting point of the material of the rod holder 120. Accordingly, the reference threshold temperature may be set by choosing, as the material of the rod holder 120, a material having a melting point equal to a desired reference threshold temperature. The reference threshold temperature may also be set by choosing, as the material of the rod holder 120, a material having a melting point or within a reference number of degrees, for example, 5° Celsius or Fahrenheit, of a desired reference threshold temperature.

The length of the indicating rod 130 is such that a first distance 141 between the upper opening 112 of the outer housing 110 and the surface of the rod holder 120 upon which the indicating rod 130 rests is shorter than a length of the indicating rod 130. Accordingly, in the elevated position, the indicating rod protrudes a second distance 142 above the upper opening 112 of the outer housing 110. Further, in the elevated position, the bottom surface 134 of the indicating rod is held a third distance 143 above the bottom surface 114 of the outer housing 110. The third distance 143 may be greater than the second distance 142. The space in between the rod holder 120 and the bottom surface 114 of the outer housing 110 forms a lower region 150 of the outer housing 110.

The distance 142 may be, for example, 5 inches. The distance 142 may also be larger or smaller than 5 inches. The second distance 142 may be any distance large enough for an operator of the reactor facility in which the temperature indicating device 100 is being used to visually confirm the indicating rod 130 is in the elevated position. The second distance 142 may be equal to, for example, a difference between a length of the indicating rod 132 and the first distance 141. Accordingly, by selecting the length of the indicating rod 130 and vertical position of the rod holder 120 within the outer housing 110, the second distance 142 may be set in accordance with the preferences of an operator of the reactor facility in which the temperature indicating device 100 is being used.

As is illustrated by the example shown in FIG. 2, under excessive temperature conditions, the indicating rod 130 is in a fallen position. Excessive temperature conditions may be defined as conditions in which a temperature inside the fuel bundle temperature sensing device 100, for example at the location of the rod holder 120, exceeds the reference temperature threshold.

As is discussed above, according to at least one example embodiment, a melting point of the material of the rod holder 120 is equal to the reference threshold temperature. Accordingly, under excessive temperature conditions, the rod holder 120 has melted, and thus, a bottom surface 134 of the indicating rod 130 no longer rests upon the rod holder 120. Because, as is discussed above, the third distance 143 between the rod holder 120 and the bottom surface 114 of the outer housing 110 is greater than the second distance 142, once the rod holder 120 melts, the bottom surface 134 of the indicating rod 130 falls to the lower surface 114 of the outer housing 110. Consequently, an upper surface 132 of the indicating rod falls below the upper opening 112 of the outer housing 110.

The upper portion of the indicating rod 130 which was visible above the upper opening 112 of the outer housing 110 during normal temperature conditions as is illustrated in FIG. 1 is no longer visible above the upper opening 112 of the outer housing 110 during excessive temperature conditions as is illustrated in FIG. 2. Accordingly, the disappearance of the indicating rod 130 serves and a visual indication that a temperature inside the fuel bundle temperature sensing device 100 has exceeded the reference temperature threshold.

Figure 3:
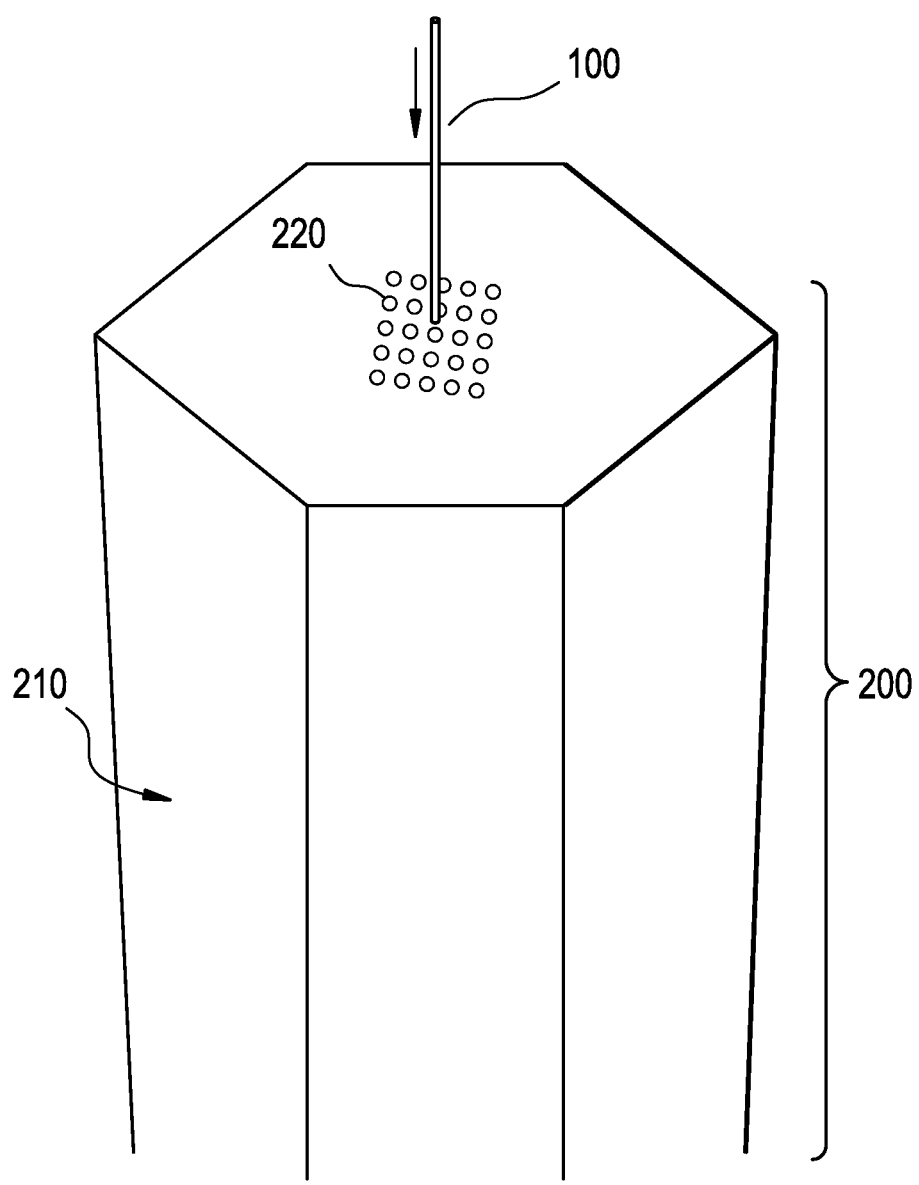
FIG. 3 illustrates a fuel assembly according to at least one example embodiment.
Figure 4:
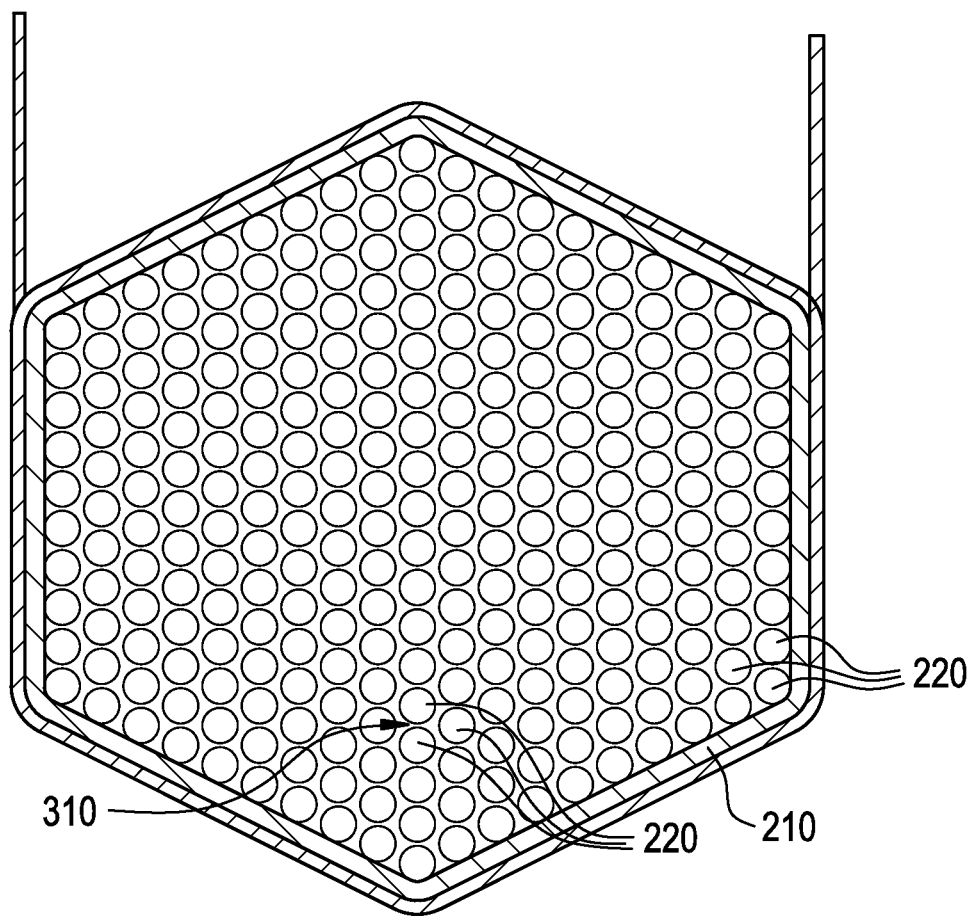
FIG. 4 illustrates a location of the fuel bundle temperature sensing device with respect to a cross-sectional view of the fuel assembly according to at least one example embodiment

FIG. 3 illustrates a fuel assembly 200 according to at least one example embodiment. FIG. 4 illustrates a location of the temperature sensing device 100 with respect to a cross-sectional view of the fuel assembly 200 according to at least one example embodiment. Referring to FIG. 3, the fuel assembly 200 may include a fuel channel 210, fuel rods 220, and the temperature sensing device 100. The fuel rods 220 may be included in a fuel bundle inside the fuel channel 210. The temperature sensing device 100 may be inserted in between two or more of the fuel rods 220. The positioning of the temperature sensing device 100 is illustrated in FIG. 4. In FIG. 4, the fuel rods 220 are represented as circles inside the hexagonal fuel channel 210. As is illustrated in FIG. 4, the circular fuel rods 220 may be arranged such that a space exists in between them. For example, in the example illustrated in FIG. 4, for every set of three fuels rods arranged in a triangular shape, a space 310, exists in between the three fuel rods. The temperature sensing device 100 may be positioned inside the space 310. The temperature sensing device 100 may be positioned such that the indicating rod 130 may be visible above the tops of the fuel rods 220 when the indicating rod is in the elevated position during normal temperature conditions. The lower surface 114 of the temperature sensing device 110 may be supported, for example, by a spacer (not shown) which is located below an upper surface of the fuel assembly 200 and holds the fuel rods 220 in place.

Though, for the purpose of simplicity, only one temperature sensing device is illustrated in FIG. 3, there may be any number of temperature sensing devices at various position within the fuel rods 220. For example, temperatures within the fuel rods 220 may vary in a radial direction outwards from a point in the center of the fuel rods 220, as well as a vertical direction along a length of the fuel rods 220. Accordingly, an operator of the reactor facility in which the fuel assembly 220 is included may place temperature sensing device 100 at any position within the fuel rods 220 where the operator desires a visual indication of temperatures exceeding a threshold temperature.

Further, different types of temperature sensing devices 100 may be used in accordance with a preference of the operator. For example, the vertical positions of the rod holders 120 of the temperature sensing devices 100 may vary so the operator can gauge temperatures of the fuel rods 220 at varying vertical positions. As another example, the materials of the rod holders 120 of the temperature sensing devices 100 may be chosen to have varying melting points so the operator can use different temperature thresholds at different positions within the fuel rods 220.

As is discussed above, each temperature sensing device 100 provides a visual indication of an excessive temperature conditions at a position within the fuel rods 220. Once a visual indication of excessive temperature conditions provided by the temperature sensing device 100 is discovered by an operator of the reactor facility, the operator is notified that the bundle integrity has been comprised and should be inspected for possible damage. Accordingly, the fuel rods in the vicinity of the temperature sensing device 100 may be investigated in order to determine and, if possible, address the causes of the detected excessive temperature.

Accordingly, the temperature sensing device 100 according to at least one example embodiment is a passive instrument that maintains functionality even throughout a station blackout event since the device self-powered.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

What is claimed:

1. A nuclear reactor system comprising:
   a fuel assembly including a fuel channel;
   fuel rods inside the fuel channel; and
   a temperature indicator inserted in between two or more of the fuel rods, the temperature indicator including,
      an indicating rod made of a first material;
      an outer housing having an upper opening, the outer housing being made of a second material and surrounding at least a portion of the indicating rod; and
      a rod holder attached to an inner surface of the outer housing, the rod holder being made of a third material and being configured to support the indicating rod such that a top surface of the indicating rod extends out of the upper opening of the outer housing, the third material having a lower melting point than the first and second materials,
   wherein,
      the rod holder extends in a first direction from a first portion of the inner surface to a second portion of the inner surface opposite the first portion,
      the indicating rod extends in a second direction from an upper surface of the rod holder out of the upper opening of the outer housing,
      a length of the rod holder in the first direction is greater than a thickness of the rod holder in the second direction,
      the indicating rod, the outer housing and the rod holder are each configured such that if the rod holder melts, the indicating rod will fall within the outer housing such that the top surface of the indicating rod is not visible above the upper opening of the outer housing, and
      the rod holder is configured to melt at a temperature exceeding a threshold temperature in the fuel channel.

2. The nuclear reactor system of claim 1, wherein the outer housing has a bottom surface that is spaced away from the upper opening and spaced away from a first position on the inner surface of the outer housing at which the rod holder is attached to the outer housing such that the first position is in between the upper opening and the bottom surface of the outer housing.

3. The nuclear reactor system of claim 2, wherein a first distance between an uppermost surface of the indicating rod and the upper opening of the outer housing is less than a second distance between a lowermost surface of the indicating rod and the bottom surface of the outer housing.

4. The nuclear reactor system of claim 2, wherein a region within the outer housing in between the first position and the bottom surface of the outer housing is filled with air.

5. The nuclear reactor system of claim 1, wherein the third material is aluminum.

6. The nuclear reactor system of claim 1, wherein the outer housing is cylindrical in shape and the rod holder is a circular disc attached to the inner surface of the outer housing.

7. The nuclear reactor system of claim 6, wherein the circular disc is attached to the outer housing such that the circular disc spans an inner diameter of the outer housing.

8. The nuclear reactor system of claim 3, wherein the indicating rod, the outer housing and the rod holder are each configured such that if the rod holder melts, the indicating rod will fall within the outer housing such that the lowermost surface of the indicating rod contacts and rests upon the bottom surface of the outer housing.

9. A nuclear reactor system comprising:
   a fuel assembly including a fuel channel;
   fuel rods inside the fuel channel; and
   a temperature indicator inserted in between two or more of the fuel rods,
   the temperature indicator including,
      an indicating rod made of a first material,
      an outer housing having an upper opening, the outer housing being made of a second material and surrounding at least a portion of the indicating rod, and
      a rod holder attached to an inner surface of the outer housing, the rod holder being made of a third material and being configured to support the indicating rod such that a top surface of the indicating rod extends out of the upper opening of the outer housing, the third material having a lower melting point than the first and second materials,
   wherein,
      the rod holder extends in a first direction from a first portion of the inner surface to a second portion of the inner surface opposite the first portion,
      the indicating rod extends in a second direction from an upper surface of the rod holder out of the upper opening of the outer housing,
      a length of the rod holder in the first direction is greater than a thickness of the rod holder in the second direction,
      the indicating rod, the outer housing and the rod holder are each configured such that if the rod holder melts, the indicating rod will fall within the outer housing such that the top surface of the indicating rod is not visible above the upper opening of the outer housing, and
      the rod holder is configured to melt at a temperature exceeding a threshold temperature in the fuel channel.

10. The nuclear reactor system of claim 9, wherein the outer housing has a bottom surface that is spaced away from the upper opening and spaced away from a first position on the inner surface of the outer housing at which the rod holder is attached to the outer housing such that the first position is in between the upper opening and the bottom surface of the outer housing.

11. The nuclear reactor system of claim 10, wherein a first distance between an uppermost surface of the indicating rod and the upper opening of the outer housing is less than a second distance between a lowermost surface of the indicating rod and the bottom surface of the outer housing.

12. The nuclear reactor system of claim 10, wherein a region within the outer housing in between the first position and the bottom surface of the outer housing is filled with air.

13. The nuclear reactor system of claim 9, wherein the third material is aluminum.

14. The nuclear reactor system of claim 9, wherein the outer housing is cylindrical in shape and the rod holder is a circular disc attached to the inner surface of the outer housing.

15. The nuclear reactor system of claim 14, wherein the circular disc is attached to the outer housing such that the circular disc spans an inner diameter of the outer housing.

16. The nuclear reactor system of claim 11, wherein the indicating rod, the outer housing and the rod holder are each configured such that if the rod holder melts, the indicating rod will fall within the outer housing such that the lowermost surface of the indicating rod contacts and rests upon the bottom surface of the outer housing.

17. The temperature indicator of claim 1, wherein the indicating rod, the outer housing and the rod holder are each configured such that if the rod holder melts, the indicating rod will fall within the outer housing such that an uppermost surface of the indicating rod changes from being outside the outer housing and visible above the upper opening of the outer housing before the rod holder melts to being inside the outer housing and not being visible above the upper opening of the outer housing after the rod holder melts.

18. The nuclear reactor system of claim 9, wherein the indicating rod, the outer housing and the rod holder are each configured such that if the rod holder melts, the indicating rod will fall within the outer housing such that an uppermost surface of the indicating rod changes from being outside the outer housing and visible above the upper opening of the outer housing before the rod holder melts to being inside the outer housing and not being visible above the upper opening of the outer housing after the rod holder melts.

19. A nuclear reactor system comprising:
a fuel assembly including a fuel channel;
fuel rods inside the fuel channel; and
a temperature indicator inserted in between two or more of the fuel rods, the temperature indicator including,
   a tubular housing having an upper opening at one end and a bottom surface at the other end, the tubular housing being made of a first material and having a first length,
   an indicating rod made of a second material and having a second length, the first length of the tubular housing being greater than the second length of the indicating rod, and
   a rod holder, having a disc shape, attached to an inner surface of the tubular housing and spaced between the upper opening and bottom surface of the tubular housing defining an intermediate surface within the tubular housing, the rod holder being made of a third material having a lower melting point than the first and second materials, and the intermediate surface being spaced from the bottom surface of the tubular housing by a first distance,
wherein the intermediate surface defined by the rod holder supports the indicating rod within the tubular housing such that an upper end of the indicating rod extends above the upper opening of the tubular housing by a second distance, the first distance being greater than the second distance,
wherein the bottom surface of the tubular housing supports the indicating rod when the rod holder melts such that the upper end of the indicating rod extends below the upper opening of the tubular housing, and
the rod holder is configured to melt at a temperature exceeding a threshold temperature in the fuel channel.

* * * * *